Jan. 28, 1964 G. WOLF 3,119,229
EXHAUST VALVE CONTROL OF A TWO-CYCLE INTERNAL COMBUSTION
ENGINE HAVING AN EXHAUST GAS TURBOSUPERCHARGER
Filed March 13, 1961
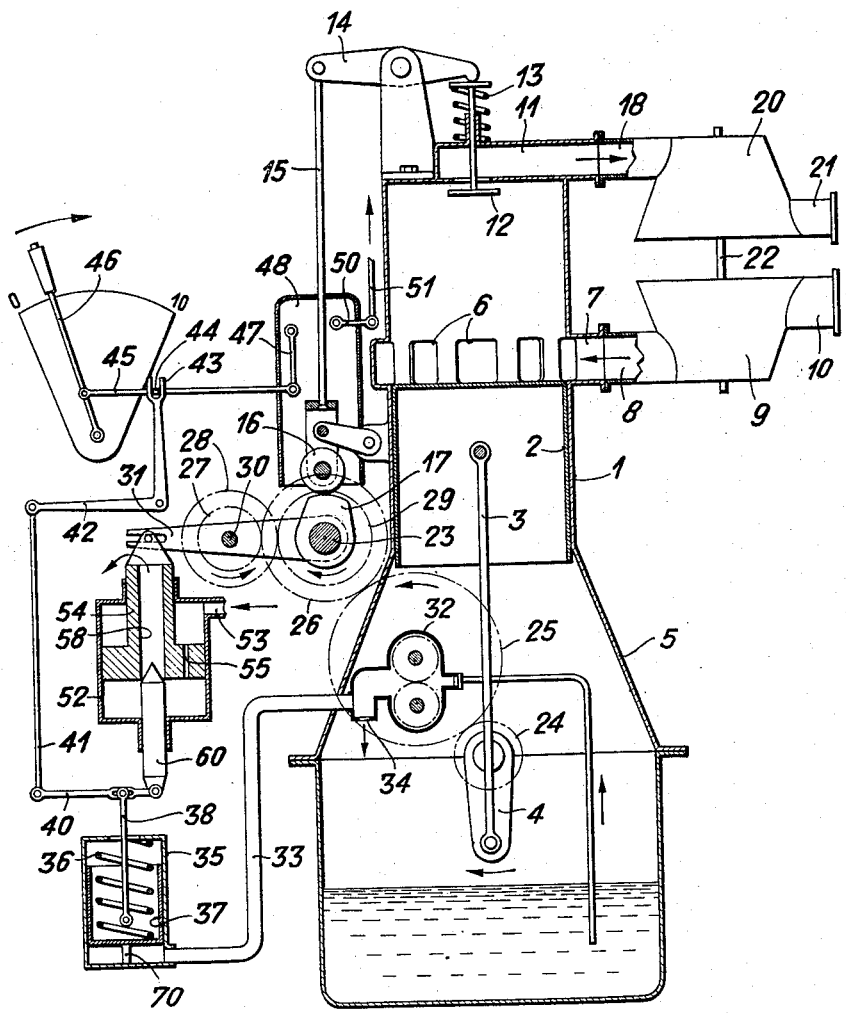
Inventor:
GOTTLIEB WOLF
By K. A. Mayr
ATTORNEY.

3,119,229
EXHAUST VALVE CONTROL OF A TWO-CYCLE INTERNAL COMBUSTION ENGINE HAVING AN EXHAUST GAS TURBOSUPERCHARGER
Gottlieb Wolf, Winterthur, Switzerland, assignor to Sulzer Freres, S.A., Winterthur, Switzerland, a corporation of Switzerland
Filed Mar. 13, 1961, Ser. No. 95,241
Claims priority, application Switzerland Mar. 15, 1960
7 Claims. (Cl. 60—13)

The present invention relates to a system for controlling the exhaust valve of a two-cycle internal combustion engine having a free-running turbocharger, i.e., a supercharger driven exclusively by a gas turbine operated by the exhaust gas of the engine, and a speed regulator whereby opening of the exhaust valve is advanced upon a reduction of the engine speed and upon a desired acceleration of the engine.

In order to improve the acceleration performance or maneuverability of two-cycle engines having a free-running turbosupercharger, it has been proposed to adjust the preexhaust angle in response to the speed of the engine whereby the preexhaust angle is increased when the speed decreases and the preexhaust angle is reduced when the speed increases. This results in a rapid acceleration of the engine and avoids the difficulties accompanying the acceleration of supercharged two-cycle engines of this kind.

According to the invention the acceleration performance of supercharged two-cycle internal combustion engines having a free-running turbosupercharger and equipped with a speed regulator is further improved by adjusting the preexhaust angle in response to a combination of the actual speed of the engine and of the desired speed whereby decreasing speed of the engine increases the preexhaust angle and vice versa, and, in addition, an increase of the desired speed above the actual speed increases the preexhaust angle and vice versa.

The system according to the invention affords a minimal fuel consumption under steady conditions over the entire operating range of the engine and no compromise need be made between optimal fuel consumption and maximal supercharging pressure. This is important for the acceleration performance of the engine.

The novel features which are considered characteristic of the invention are set forth with particularity in the appended claims. The invention itself, however, and additional objects and advantages thereof will best be understood from the following description of embodiments thereof when read in connection with the accompanying drawing, the one figure of which is a diagrammatic part sectional illustration of an engine provided with a control system according to the invention.

Referring more particularly to the drawing, numeral 2 designates a piston reciprocating in a cylinder 1 provided with scavenging ports 6. The piston 2 drives a crankshaft 4 in a crankcase 5 by means of a connecting rod 3. The scavenging ports 6 receive air from an air supply conduit 7 which is connected to the outlet of a compressor 9 having an air inlet 10. The cylinder 1 is provided with an exhaust valve 12 controlling the exhaust into a conduit 11. The valve 12 is actuated by means of a cam 17 acting on a cam follower roller 16 at the end of a rod 15 which is pivotally connected to a rocker 14 having an arm engaging the valve 12 for opening the valve against the action of a spring 13. The exhaust pipe 11 is connected to the inlet 18 of a turbine 20 having an exhaust outlet 21. The rotors of the turbine 20 and of the compressor 9 are mounted on a common shaft 22. The cam 17 is mounted on a cam shaft 23 and is driven by the crankshaft 4 through gears 24 to 29. The gear 26 is rotatable on the cam shaft 23. The gears 27 and 28 are interconnected and are both freely rotatable around a pin 30. The gear 29 is fast on the cam shaft 23. The aforementioned pin 30 is supported by a lever 31 swingable on the cam shaft 23.

A gear pump 32 diven by the gear 25 draws oil from the sump of the crankcase 5 and delivers the oil through a pipe 33 into the space below a piston 37 in a cylinder 35. The pipe 33 is provided with a sharp-edged outlet orifice 34 for relieving oil into the crankcase. The pressure of the oil below the piston 37 counteracts a spring 36. The piston 37 is provided with a piston rod 38 actuating a lever 40. One end of the lever 40 is pivoted to a link 41 which is pivotally connected to one end of an elbow lever 42. The second end of the elbow lever is provided with a fork 43 straddling a pin 44 mounted on a rod 45. The latter connects a lever or handle 46 for adjusting the speed of the engine to a set point adjusting lever 47 of a conventional speed governor 48 which is not shown in detail. The speed governor 48 actuates a lever 50 in the conventional manner, the lever being connected by a rod 51 to a conventional injection adjusting mechanism of a fuel injection pump, not shown.

A follow-up control device is interposed between the levers 31 and 40 which device comprises a cylinder 52 containing a piston 54. A pressure medium is fed through a pipe 53 into the space in the cylinder 52 above the piston 54. The latter is provided with a throttling bore 55 and with a central discharge bore 58. A control valve 60 is provided at the lower end of the bore 58 and is connected to the free end of the lever 40. The valve 60 is guided in the cylinder 52 and adapted to close the lower end of the bore 58 in the piston 54. Because of the provision of the orifice 34, the pressure in the pipe 33 is approximately proportional to the square of the speed of the crankshaft 4. If this speed increases, the pressure in the pipe 33 increases and moves the piston 37 in the cylinder 35 against the action of the spring 36. This effects movement of the lever 40 to move the valve 60 in a closing direction with respect to the bore 58 in the piston 54. Therefore, discharge of the pressure medium in the space below the piston 54 through the passage 58 is throttled or prevented so that the piston 54 moves upward and swings the lever 31 in clockwise direction. This causes movement of the cam 17 to delay opening of the exhaust valve 12 relative to the position of the crankshaft 4. A reduction of the speed of the crankshaft 4 effects a drop of the pressure in the pipe 33 so that opening of the exhaust valve 12 is advanced relative to the crankshaft. Because of this advanced opening of the exhaust valve, exhaust gas from an earlier part of the expansion in the cylinder 1, i.e. exhaust gas of a relatively high pressure and temperature, enters the turbine 20, increasing the speed thereof and also increasing the pressure of the air delivered by the compressor 9.

In order to accelerate the engine the lever 46 is moved in the direction of the arrow shown in the drawing. This causes movement of the lever 42 in clockwise direction and lifting of the left end of the lever 40. If the piston 37 has not moved, the valve 60 is moved downward and opened, causing a downward movement of the piston 54 and movement of the lever 31 in counterclockwise direction whereby the preexhaust angle is increased. The clockwise movement of the speed control lever 46 also adjusts the set point lever 47 of the governor 48 so that the latter increases the fuel injection into the cylinder 1. Due to this increased fuel injection and advancing of the opening of the exhaust valve 12 the speed of the turbine 20 is increased, causing an increase of the air supplied to the scavenging ports 6. The pressure of the air in the air supply pipe 7 rapidly reaches the value corresponding to the greater speed of or load on the engine. The preexhaust is not retarded until the piston 37 is moved upward due to the increased speed of the engine.

With the system according to the invention the preexhaust and thereby a shifting of a portion of the energy available from the engine to the turbine is not only effected in response to the speed of the engine but is also effected in response to a difference between the set point set by the levers 46 and 47 and the actual speed of the engine to which the pressure in the pipe 33 is responsive. Under steady conditions both values are equal and the lever 40 is in the horizontal position shown in the drawing. There is a definite relation between the speed of the crankshaft 4 and the elevational position of the lever 40. If there is a difference between the desired or set point speed of the engine and the actual speed of the engine, as is the case when the operating conditions are not steady, i.e., if the levers 46 and 47 are adjusted to produce a speed which is different from the actual speed of the motor, the lever 40 is swung in one or the opposite direction. During acceleration the actual speed of the engine trails the desired speed. Therefore, the preexhaust angle is increased in addition to the adjustment in response to the speed of the engine. In this way the turbine 20 receives additional energy and can more rapidly supply the air pressure required for the new operating conditions.

The system described and illustrated represents only an example and the invention is in no way restricted thereto. The adjustment of the preexhaust in relation to the position of the crankshaft can be effected by other suitable means. The speed measurement which, in the illustrated example, is effected by the pump 32 and the orifice 34, can be done in a different and conventional manner.

The functional relationship between the speed of the engine and the preexhaust advance may also be effected to follow a predetermined law which has been found desirable, for example, by tests. This relation may be continuous or discontinuous. If, for example, the spring 36 has a nonlinear characteristic, a desired continuous relationship between the speed and the advance of the preexhaust can be obtained. In some cases a discontinuous ratio between these two values may be desirable. In the arrangement illustrated, such a discontinuous ratio may be obtained, for example, by providing the piston 37 with an abutment 70 and by initially tensioning the spring 36. If a soft spring having a considerable initial tension is employed, the piston assumes only two extreme positions. If the pressure in the pipe line 33 is below a predetermined pressure, the piston 37 is in its lowermost position. If the pressure rises above said predetermined pressure, the force of the spring is overcome and the piston 37 is moved to its uppermost position. In this way the system according to the invention can be considerably simplified.

I claim:
1. In a supercharged two-cycle internal combustion engine:
  an exhaust gas driven turbine,
  a compressor driven by said turbine for supplying scavenging and combustion air to the engine,
  an exhaust valve controlling the gas supply to said turbine,
  a crankshaft,
  actuating means connected to said crankshaft and to said exhaust valve for actuating the latter,
  said actuating means including timing means for varying the timing of the actuation of said exhaust valve,
  a speed governor responsive to a predetermined crankshaft speed for controlling the fuel supply to the engine for maintaining said predetermined speed,
  a regulator operatively connected to said speed governor for varying said predetermined speed,
  means responsive to the actual speed of the crankshaft,
  means operatively connected to said regulator and to said actual crankshaft speed responsive means and being responsive to the difference between said predetermined speed and the actual speed of the crankshaft,
  said last mentioned means being operatively connected to said timing means for advancing opening of said exhaust valve when said predetermined speed is higher than the actual crankshaft speed and conversely.

2. In a supercharged two-cycle internal combustion engine according to claim 1 and wherein said actuating means includes:
  a camshaft,
  a first gear rotatable on said camshaft and driven by said crankshaft,
  a second gear fast on said camshaft,
  a lever swingable on said camshaft,
  a third gear rotatably supported by said lever and engaged by said first gear for rotation thereby, and
  a fourth gear coaxially connected to said third gear and engaging said second gear for driving said second gear,
  said lever being operatively connected to said means connected to said regulator and to said actual crankshaft speed responsive means for actuation of said lever in response to the difference between said predetermined speed and the actual crankshaft speed.

3. In a supercharged two-cycle internal combustion engine as defined in claim 1 and wherein said last mentioned means includes:
  a lever having a movable fulcrum and capable of changing the position of the fulcrum,
  said fulcrum being operatively connected to said actual speed responsive means for changing the position of said fulcrum in response to the actual speed of the crankshaft,
  means operatively connected to said lever and to said regulator for actuation thereby upon a variation of said predetermined speed, and
  means operatively connected to said lever and to said timing means for actuating said timing means by said lever.

4. In a supercharged two-cycle internal combustion engine according to claim 3:
  an oil sump,
  said actual crankshaft speed responsive means including:
  a gear pump connected to said crankshaft for drive thereby,
  said gear pump having an inlet pipe extending into said oil sump for receiving oil therefrom,
  a cylinder,
  a piston movable in said cylinder,
  a spring interposed between said cylinder and said piston for urging said piston in one direction and restraining movement of said piston in the opposite direction,
  said piston being connected to said fulcrum for changing the position thereof upon movement of said piston,
  said gear pump having an outlet conduit terminating in said cylinder for supplying oil thereto for moving said piston against the action of said spring, an oil discharge outlet connected to said outlet conduit for discharging oil pumped by said gear pump into said oil sump, and an orifice plate in said discharge outlet for causing the pressure in said outlet conduit to be proportional to a predetermined multiple of the crankshaft speed.

5. In a supercharged two-cycle internal combustion engine according to claim 3 and wherein said means operatively connected to said lever and to said timing means includes a follow-up control device.

6. In a supercharged two-cycle internal combustion engine according to claim 4 wherein said spring has a non-linear characteristic.

7. In a supercharged two-cycle internal combustion engine according to claim 4 wherein said spring is initially tensioned.

References Cited in the file of this patent

UNITED STATES PATENTS

| | | |
|---|---|---|
| 2,097,883 | Johansson | Nov. 2, 1937 |
| 2,191,459 | Duncan | Feb. 27, 1940 |
| 2,248,780 | Pierce | July 8, 1941 |
| 2,820,339 | Grieshaber et al. | Jan. 21, 1958 |
| 2,924,069 | Buchi | Feb. 9, 1960 |
| 2,925,066 | Thorner | Feb. 16, 1960 |
| 2,990,825 | Fuller et al. | July 4, 1961 |

FOREIGN PATENTS

| | | |
|---|---|---|
| 1,011,423 | France | Apr. 2, 1952 |